United States Patent
Ingram, Jr.

(10) Patent No.: US 11,242,120 B1
(45) Date of Patent: Feb. 8, 2022

(54) MARINE RETROFITTED ILLUMINATED DASH PANEL COVER

(71) Applicant: James S. Ingram, Jr., Arcadia, FL (US)

(72) Inventor: James S. Ingram, Jr., Arcadia, FL (US)

( * ) Notice: Subject to any disclaimer, the term of this patent is extended or adjusted under 35 U.S.C. 154(b) by 62 days.

(21) Appl. No.: 16/931,293

(22) Filed: Jul. 16, 2020

(51) Int. Cl.
  *B63B 45/06* (2006.01)
  *B63B 49/00* (2006.01)
  *B63B 45/04* (2006.01)
  *B63B 45/00* (2006.01)
  *B60Q 3/12* (2017.01)

(52) U.S. Cl.
  CPC ............. *B63B 45/06* (2013.01); *B63B 45/04* (2013.01); *B63B 49/00* (2013.01); *B60Q 3/12* (2017.02); *B63B 2045/005* (2013.01)

(58) Field of Classification Search
  CPC ...... B63B 45/04; B63B 45/06; B60Q 3/10–18
  See application file for complete search history.

(56) References Cited

U.S. PATENT DOCUMENTS

| | | | | | |
|---|---|---|---|---|---|
| 2,695,354 | A | * | 11/1954 | Neugass | G01D 11/28 362/632 |
| 2,848,830 | A | * | 8/1958 | De Courcey | B60Q 3/85 40/546 |
| 3,622,773 | A | * | 11/1971 | Schuster | B60Q 3/12 362/23.01 |
| 3,622,774 | A | * | 11/1971 | Schuster | B60Q 3/12 362/23.13 |
| 4,977,487 | A | * | 12/1990 | Okano | B60Q 1/2661 362/555 |
| 5,702,171 | A | * | 12/1997 | Lenzi | B60Q 3/14 362/23.01 |
| 6,206,533 | B1 | * | 3/2001 | Shi | B60Q 3/64 362/23.01 |
| 6,247,825 | B1 | * | 6/2001 | Borkowski | F21V 21/0885 362/489 |
| 6,575,607 | B1 | * | 6/2003 | Klemish | B60K 37/02 362/489 |
| 2015/0367775 | A1 | * | 12/2015 | Aburto Crespo | B60Q 3/14 362/510 |
| 2018/0334232 | A1 | * | 11/2018 | Poole | B63B 45/04 |
| 2021/0276483 | A1 | * | 9/2021 | Kang | B60Q 3/233 |

* cited by examiner

*Primary Examiner* — Alexander K Garlen

(57) ABSTRACT

Embodiments of the invention relate to marine retrofitted illuminated dash panel cover having a light controller and one or more light sources that is installed and retrofitted onto an existing boat dash panel, where the light source and light cover panel are aftermarket retrofitted components to the existing boat dash panel.

10 Claims, 11 Drawing Sheets

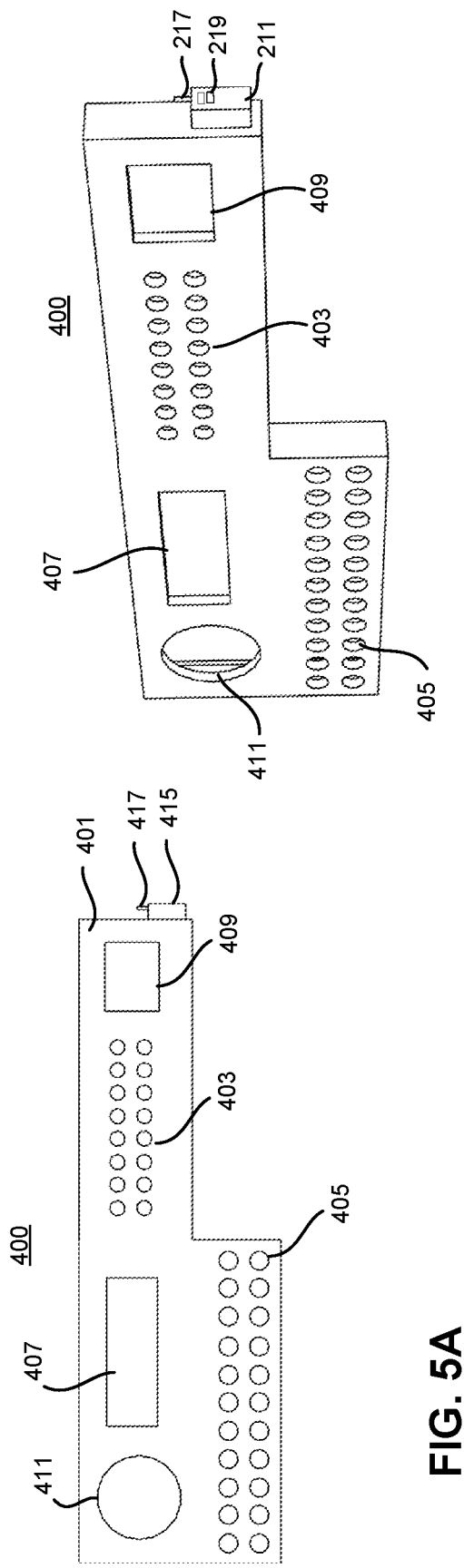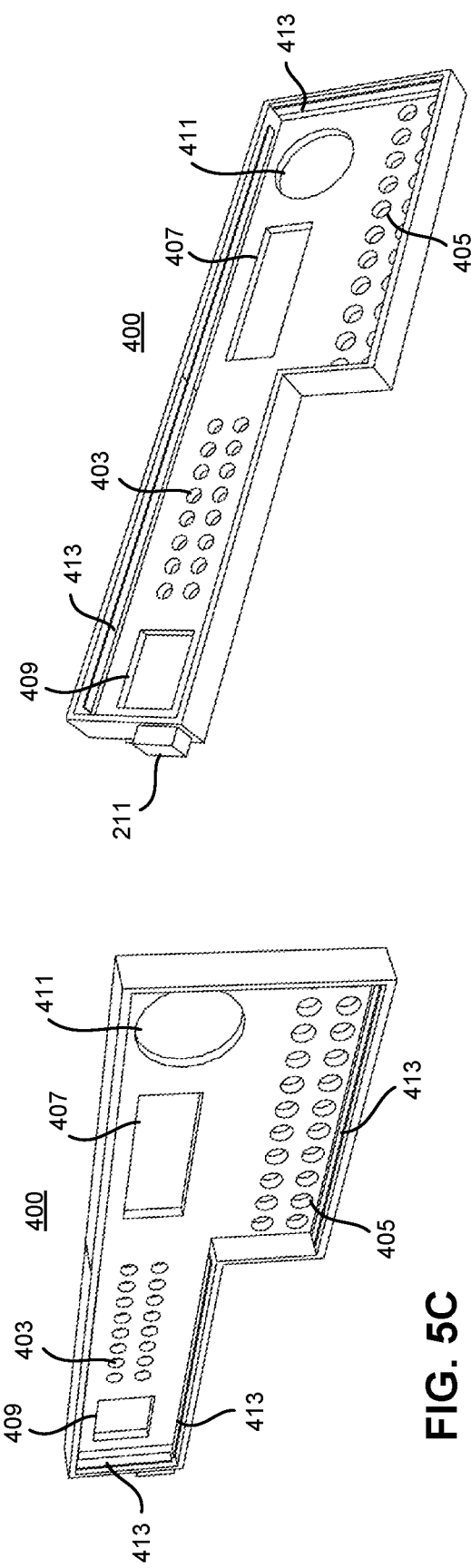

MARINE RETROFITTED ILLUMINATED DASH PANEL COVER

FIELD OF THE INVENTION

The present invention relates to a marine retrofitted illuminated dash panel cover for the boating industry. More particularly, the present invention relates to a customized aftermarket illuminated dash panel cover having one or more light sources and light controller that is configured to be retrofitted onto an existing boat dash panel having gauges, switches, indicators, chart plotters, controllers, or display panels.

BACKGROUND

Many boat manufactures offer marine dash panels that come in a variety of shapes, functionalities, and configurations. For example, boat dash panels are typically manufactured and preconfigured to have an arrangement of switches, gauges, controller, display panels, indicators, and other types of control or display items. Several of these boat dash panels may not have or offer many desirable features that may enhance the appearance, functionality and safety of the dash panels. Boat owners may upgrade their dash panels to include more enhanced features, but the cost of replacing the boat dash panel may be cost prohibitive.

Therefore, there is a need for providing the boat owner an option to address preconfigured boat dash panels using aftermarket solutions to address the above limitations, thereby increasing the look, safety and value of the boat.

SUMMARY

One object of this invention is to provide a marine retrofitted illuminated dash panel cover for illuminating an existing boat dash panel having one or more switches, buttons, and display monitors, including a light cover panel having a plurality of holes and slots, and a body having a shape and size that is configured to match the existing boat dash panel, where the plurality of holes and slots of the light cover panel allows access to the one or more switches, buttons, and display monitors of the existing boat dash panel when the light cover panel is retrofitted and mounted onto the existing boat dash panel; a light source coupled to the light cover panel for illuminating the one or more switches, buttons, and display monitors of the existing boat dash panel; and a light controller coupled to the light cover panel and the light source, where the light controller controls a light power source and different color modes of operation of the light source, where the light cover panel and the light source are aftermarket retrofitted components to the existing boat dash panel.

In one embodiment, the light cover panel may be transparent or translucent.

In another embodiment, the light controller may include a plurality of switches including a power switch and color control.

In yet another embodiment, the light controller may include a wireless transceiver and antenna.

These and other objects, features and advantages of the present invention will become more apparent in light of the following detailed description of preferred embodiments thereof, as illustrated in the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 5A—FIG. 5D illustrate a front, a front side perspective view, a first back side perspective view, and a second back side perspective view, respectively, of a marine retrofitted illuminated dash panel cover made to be retrofitted onto the boat dash panel, according to an embodiment.

DETAILED DESCRIPTION

Figure 1:
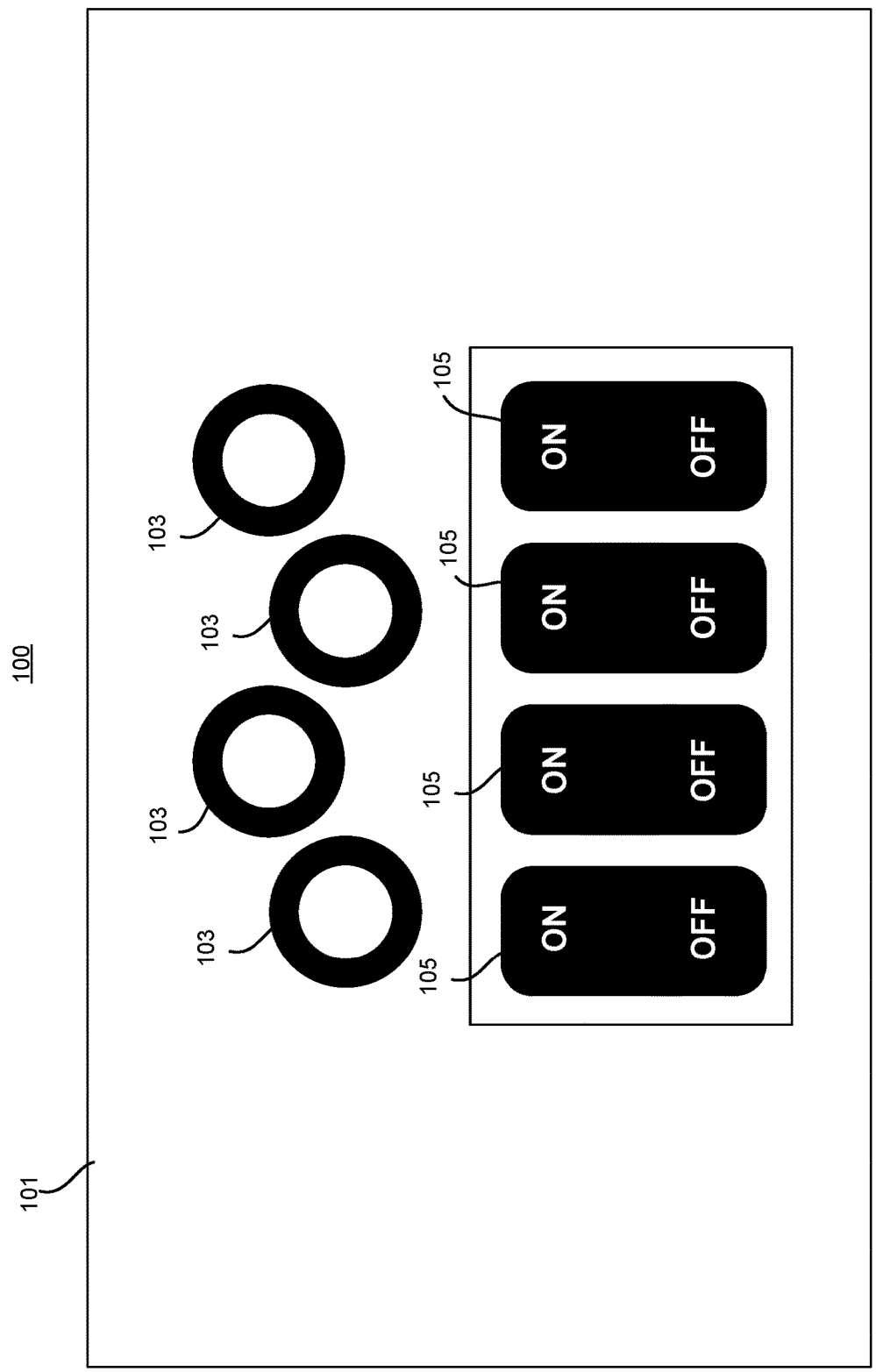
FIG. 1 illustrates a front view of a first configuration of a boat dash panel having an arrangement of dash components for controlling lighting and onboard boat accessories.

FIG. 1 illustrates a front view of a first configuration of a boat dash panel 100 having an arrangement of dash components for controlling lighting and onboard boat accessories. In this example, the boat dash panel 100 may include a plurality of buttons 103 and rocker switches 105 disposed on a platform 101 for controlling and operating the lighting and onboard accessories. The buttons 103 and rocker switches 105 may be disposed on a top portion of the platform 101 and positioned at fixed locations on the platform 101 as determined by the boat manufacturer.

Figure 2:
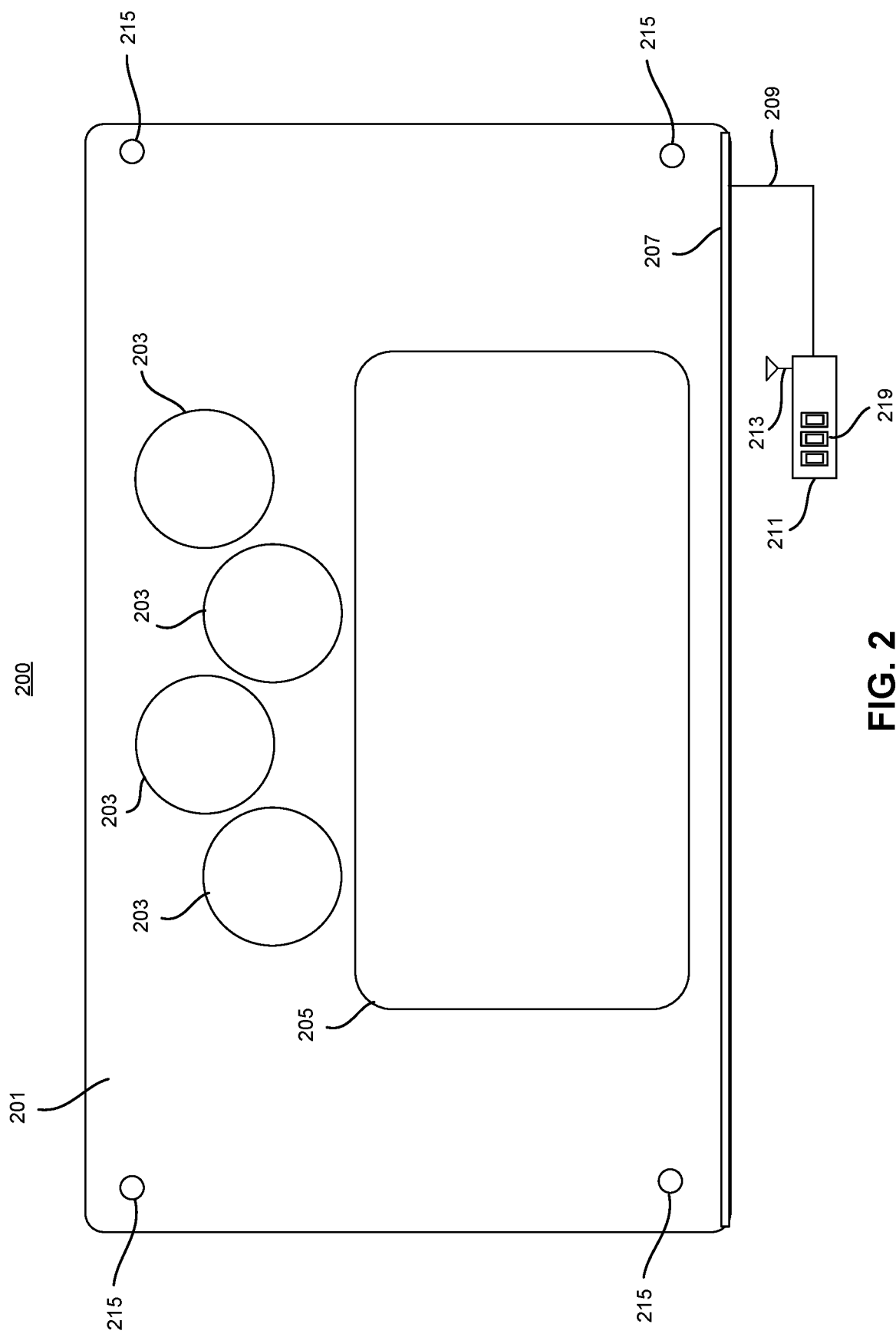
FIG. 2 illustrates a front view of a marine retrofitted illuminated dash panel cover made to be retrofitted onto the boat dash panel, according to an embodiment.

FIG. 2 illustrates a front view of a marine retrofitted illuminated dash panel cover 200 made to be retrofitted onto the boat dash panel 100, according to an embodiment. The dash panel cover 200 may include a light cover panel 201 having a similar shape and dimensions as the boat dash panel 100. The light cover panel 201 may be made from sheets of translucent or transparent materials including, for example, Plexiglas, polycarbonates, or shatterproof glass, or other clear or semi-transparent plastics. The light cover panel 201 may have a plurality of holes 203 and a slot 205 that allow access to the buttons 103 and rocker switches 105, respectively, of the boat dash panel 100 when the dash panel cover 200 is mounted onto the boat dash panel 100. In addition, the dash panel cover 200 may include one or more light sources 207 coupled along the edge of the transparent cover 201, providing a light source for emitting light and illuminating the front face of the light cover panel 201. The light source 207 may include incandescent lamps, compact fluorescent lamps, Light Emitting Diodes (LED), Fluorescent tube or Neon light strips. A light controller 211 may be coupled to the light source 207 via electrical wiring 209. In operation, the light controller 211 controls the light source 207 either directly through switches 219 on the light controller 211 or remotely via a wireless remote unit (not shown) transmitting signals to an antenna 213 and a wireless receiver (not shown) contained within the light controller 211. Control function of the light controller 211 may include power on/off the light source 207 and adjusting color selection, color intensity, and light-pulsation mode of the light source 207. In yet another implementation, the color, intensity, and pulsation mode can be controlled by most chart plotters, Bluetooth devices, or by a switch on the existing dash panel. In another implementation, a vinyl film may be applied to the light cover panel 201 to block or filter illumination from light cover panel 201. For example, a marine grade vinyl cover sheet can be added to the dash panel cover 200 to block selected areas that are not to be illuminated. The dash panel cover 200 may also include fastener holes 215 used for allowing hardware fasteners such as threaded screws 217 to pass through when the dash panel cover 200 is mounted onto the boat dash panel 100.

Figure 3:
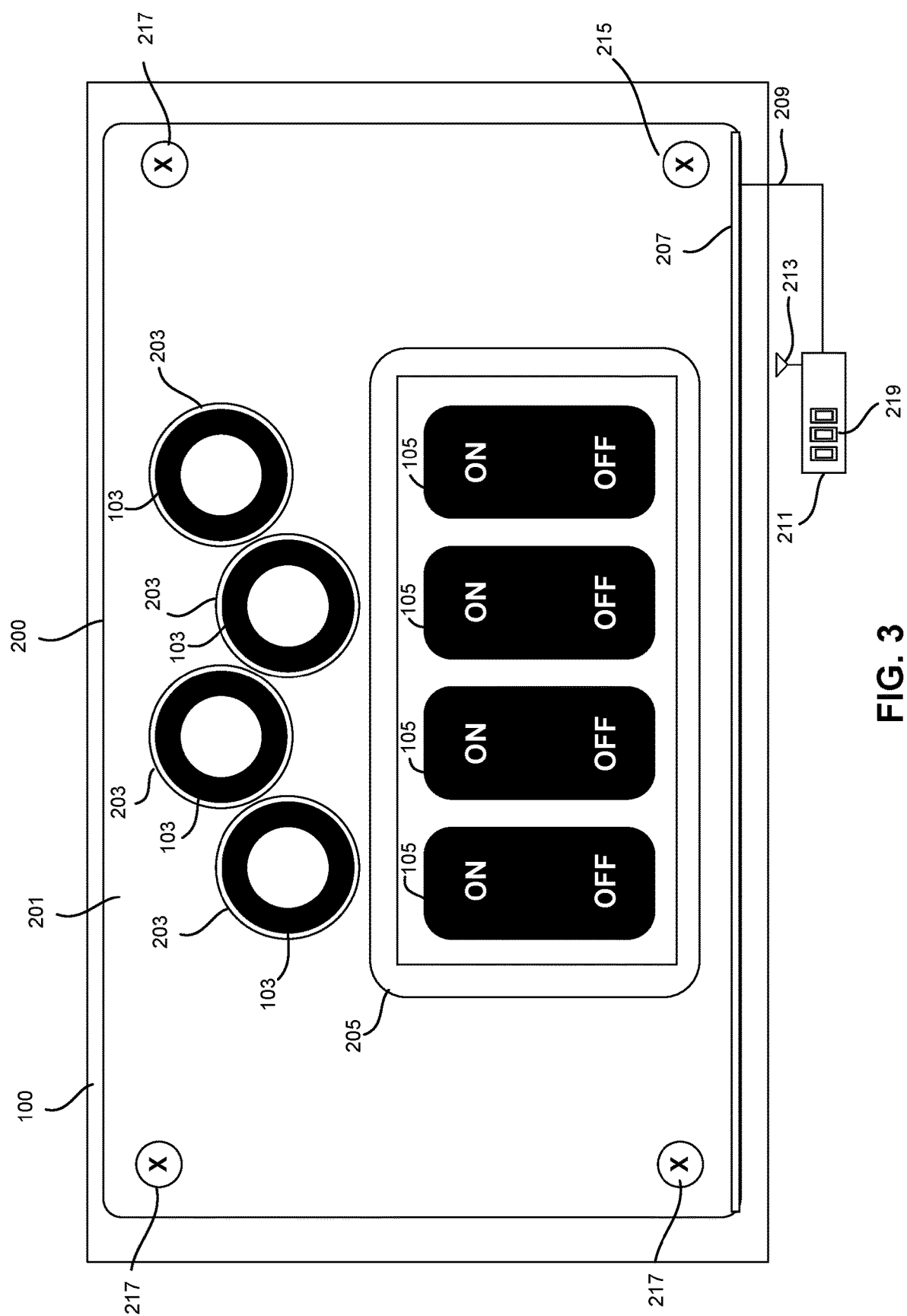
FIG. 3 illustrates a front view of the marine retrofitted illuminated dash panel cover installed and retrofitted onto the boat dash panel, according to an embodiment.
Figure 4B:
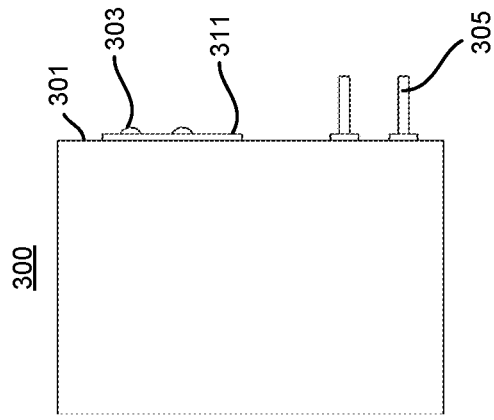
FIG. 4A—FIG. 4D illustrate a front, a side, a top, and a front perspective view, respectively, of a second configuration of a boat dash panel having dash components for controlling lighting and onboard boat accessories.
Figure 4D:
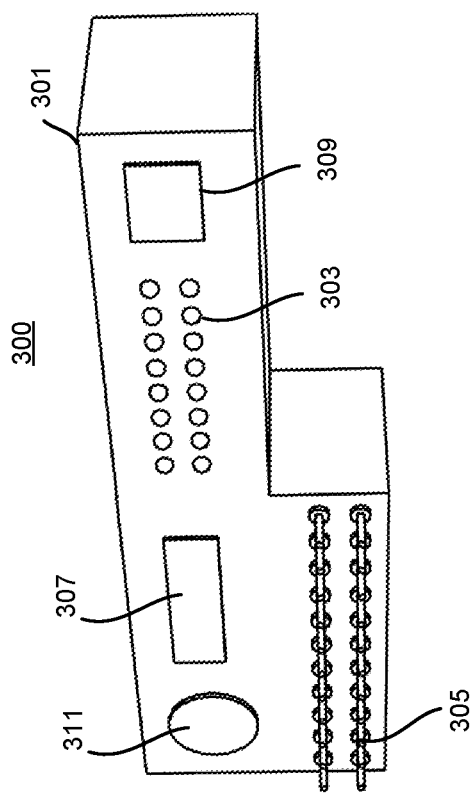
Figure 4A:
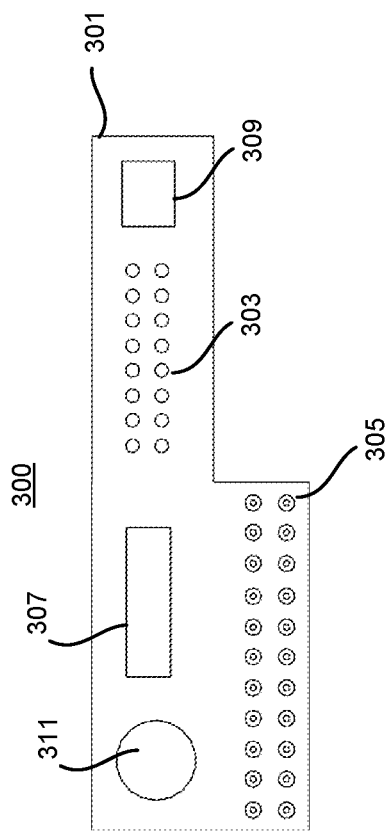
Figure 4C:
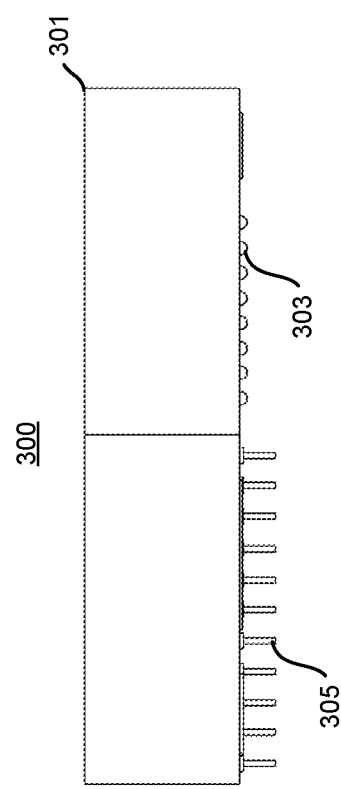

FIG. 3 illustrates a front view of the marine retrofitted illuminated dash panel cover 200 installed and retrofitted onto the boat dash panel 100, according to an embodiment. The plurality of holes 203 and slot 205 of the light cover panel 201 may be aligned and positioned above the boat dash panel 100 so that the plurality of holes 203 and slot 205 match positions of the buttons 103 and rocker switches 105 of the boat dash panel 100, allowing access of the buttons 103 and rocker switches 105 through the holes 203 and slot 205 of the light cover panel 201. Mounting and securing the marine retrofitted illuminated dash panel cover 200 to the boat dash panel 100 may be accomplished via hardware fasteners 217 along each corner of the dash panel cover 200 or by an adhesive layer such as adhesive tape or a liquid adhesive applied along the edge portion of the dash panel cover 200 between the boat dash panel 100 and the dash panel cover 200.

FIG. 4A—FIG. 4D illustrate a front, a side, a top, and a front perspective view, respectively, of a second configuration of a boat dash panel 300 having dash components for controlling lighting and onboard boat accessories. In this configuration, the boat dash panel 300 may include a plurality of buttons 303, switches 305, display monitors (307, 309), and a chart plotter 311, disposed on a platform body 301 of the boat dash panel 300 for displaying maritime information, controlling onboard systems, and operating the lighting. The buttons, switches, display monitors, and chart plotter may be disposed on a top portion of the platform body 301 and positioned at fixed locations on the platform 301 as determined by the boat manufacturer.

FIG. 5A—FIG. 5D illustrate a front, a front side perspective view, a first back side perspective view, and a second back side perspective view, respectively, of a marine retrofitted illuminated dash panel cover 400 made to be retrofitted onto the boat dash panel 300, according to an embodiment. The dash panel cover 400 may include a light cover panel 401 having the same shape and dimensions as the boat dash panel 400 as in case of the previous embodiment. The light cover panel 401 may be made from sheets of translucent or transparent materials as in the previous embodiment. The light cover panel 401 may include a plurality of holes (403, 405, 411) and rectangular slots (407, 409) that allow access to the buttons 303, switches 305, display monitors (307, 309), and a chart plotter 311 of the boat dash panel 300 when the dash panel cover 400 is mounted onto the boat dash panel 300. In addition, the dash panel cover 400 may include one or more light sources 413 coupled along the edge of the transparent cover 401, providing a light source for illuminating the front face of the light cover panel 401. The light source 413 may include and incandescent lamps, compact fluorescent lamps, Light Emitting Diodes (LED), Fluorescent tube or Neon light strips. A light controller 211 may be coupled to the one or more light sources 413 via electrical wiring (not shown). In operation, the light controller 211 controls the one or more light sources 413 either directly through switches 219 on the light controller 211 or remotely via a wireless remote unit (not shown) transmitting signals to an antenna 217 and a wireless receiver (not shown) contained with the light controller 211. Control function of the light controller 211 may include turning on/off the one or more light sources 413 and adjusting color selection, color intensity, and light-pulsation mode of the one or more light sources 413.

Figure 6:
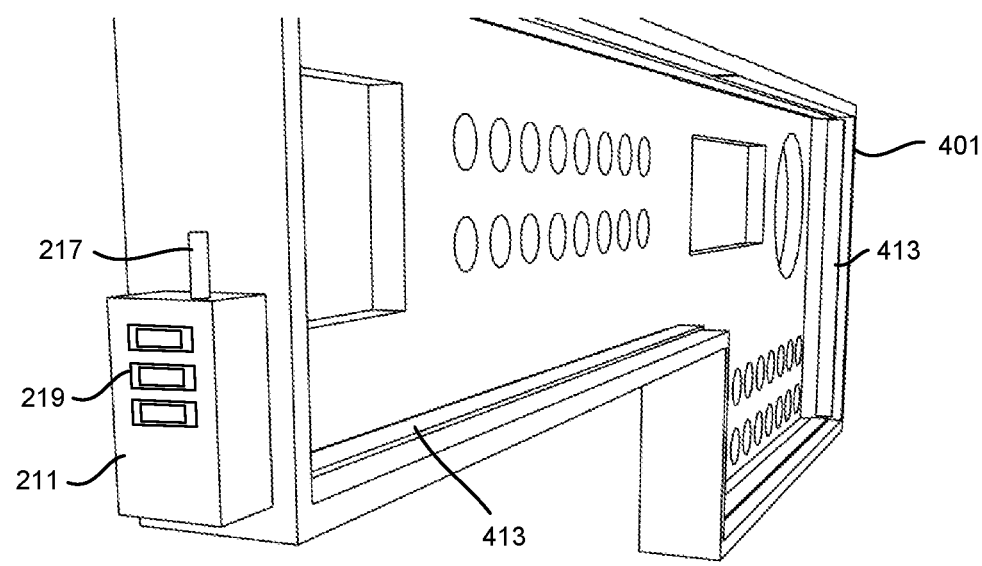
FIG. 6 illustrates a back side perspective view showing a close view of the light controller and the one or more light sources of the marine retrofitted illuminated dash panel cover, according to an embodiment.

FIG. 6 illustrates a back side perspective view showing a close view of the of the light controller 211 and the one or more light sources 413 of the marine retrofitted illuminated dash panel cover 400, according to an embodiment. The light controller 211 may be mounted directly onto a portion of the light cover panel 401 as shown. In another embodiment, the light controller 211 may be detached from the light cover panel 401 and placed near the light cover panel 401 while still be connected via the electrical wiring.

Figure 7:
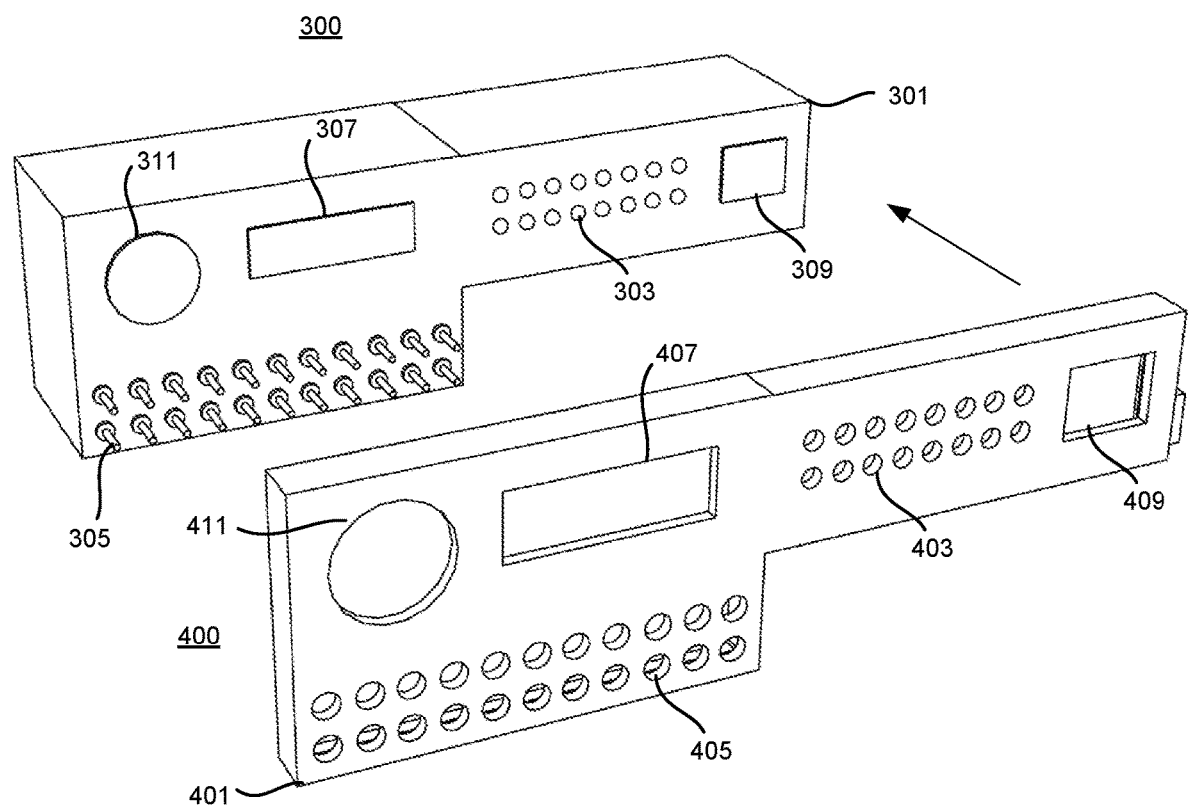
FIG. 7 illustrates a front side perspective view of the marine retrofitted illuminated dash panel cover prior to being mounted onto the boat dash panel, according to an embodiment.

FIG. 7 illustrates a front side perspective view of the marine retrofitted illuminated dash panel cover 400 and the boat dash panel 300 prior to being mounted and fastened to one another, according to an embodiment. The light cover panel 401 is configured to have a similar shape and dimensions as the boat dash panel 300. When mounting the dash panel cover 400 onto the boat dash panel 300, the back side of the dash panel cover 400 is facing the front side of the boat dash panel 300, with the holes (403, 405, 411) and rectangular slots (407, 409) aligned to the buttons 303, switches 305, display monitors (307, 309), and a chart plotter 311 of the boat dash panel 300.

Figure 8:
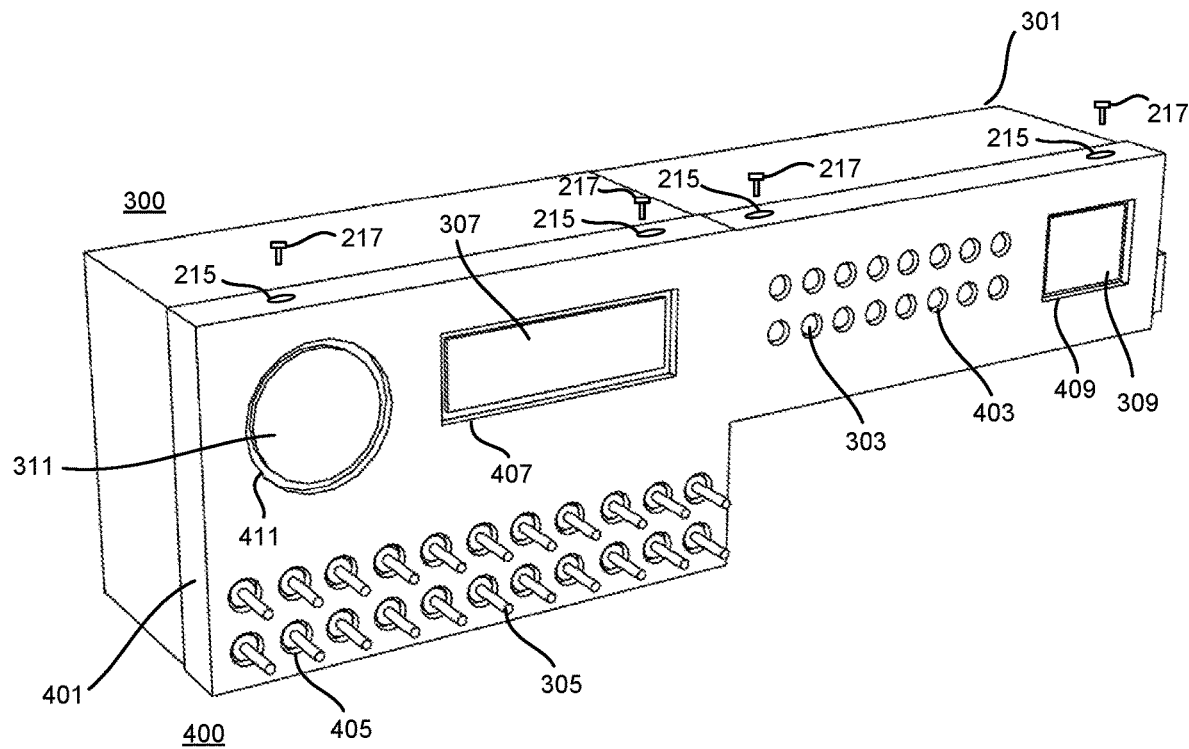
FIG. 8 illustrates a front view of the marine retrofitted illuminated dash panel cover mounted onto the boat dash panel with hardware fasteners, according to an embodiment.

FIG. 8 illustrates a front view of the marine retrofitted illuminated dash panel cover 400 mounted onto the boat dash panel 300 with hardware fasteners, according to an embodiment. With the back side of the dash panel cover 400 installed onto the front side of the boat dash panel 300, the holes (403, 405, 411) and rectangular slots (407, 409) are aligned to the buttons 303, switches 305, display monitors (307, 309), and a chart plotter 311 of the boat dash panel 300, allowing access to the buttons 303, switches 305, display monitors (307, 309), and a chart plotter 311 of the boat dash panel 300 through the holes (403, 405, 411) and rectangular slots (407, 409) of the light cover panel 401. In addition, the dash panel cover 400 may include fastener holes 215 used for allowing fasteners such as threaded screws 217 to pass through when the dash panel cover 400 is mounted onto the boat dash panel 300.

Figure 9:
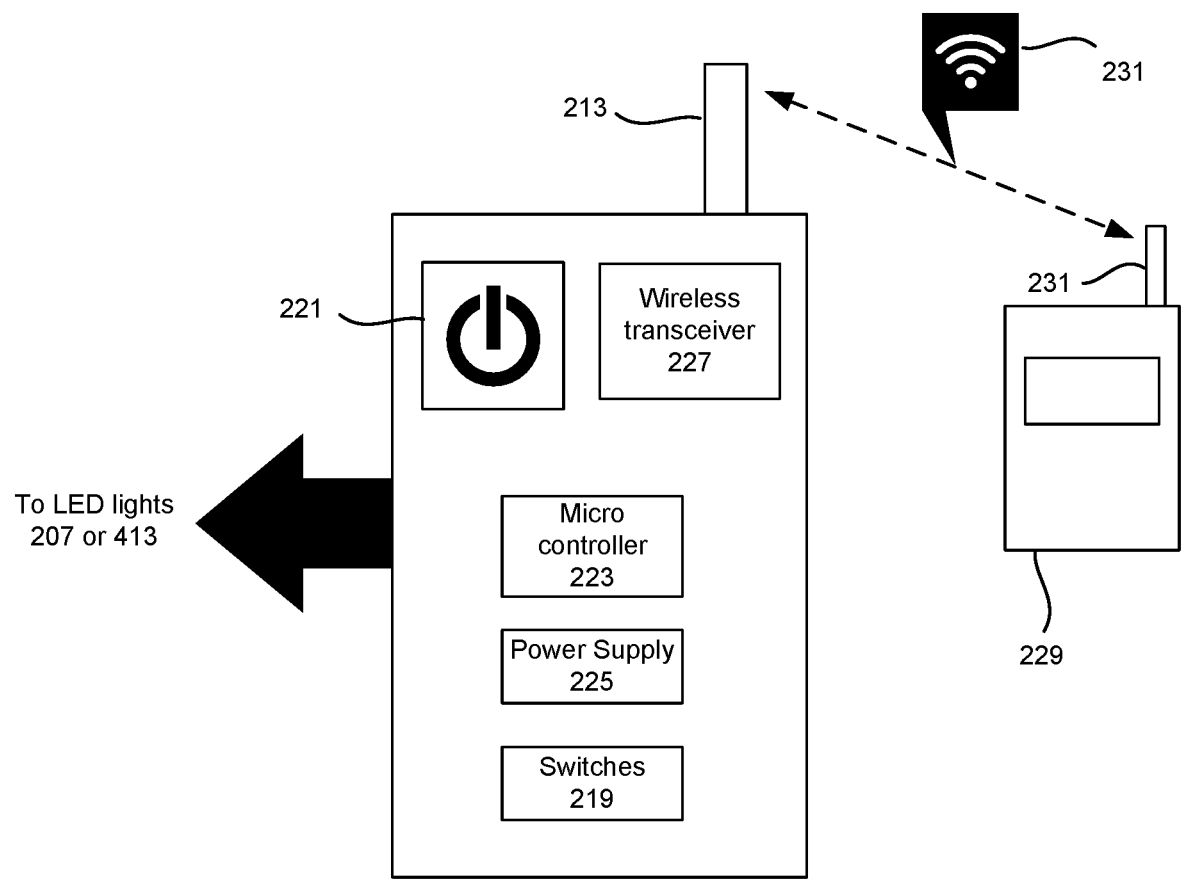
FIG. 9 illustrates circuit components of the light controller, according to an embodiment.

FIG. 9 illustrates circuit components of the light controller 211, according to an embodiment. The light controller 211 may include a power on button 221 for manually activating or disabling the light sources 207/413, a microcontroller 223 for controlling the wireless connection and light modes of operation, a wireless transceiver for communicating control information between a remote unit, a power supply for providing input power to the light controller 211 and the light source 207/413, as well as the antenna 213 and the other control switches 219 for manually changing the different modes of light operation of the light source 207/413. In another implementation, the light controller 211 may be controlled wirelessly by a remote control unit 229 through a remote control antenna 231. In the wireless control mode of operation, a user may control the power and the different modes of light operation of the light source 207/413 using the remote control unit 229, providing the user convenience and ease of operating the light controller 211. Various wireless communication protocol schemes may be implemented such as WiFi, Bluetooth, and ZigBee.

Figure 10A:
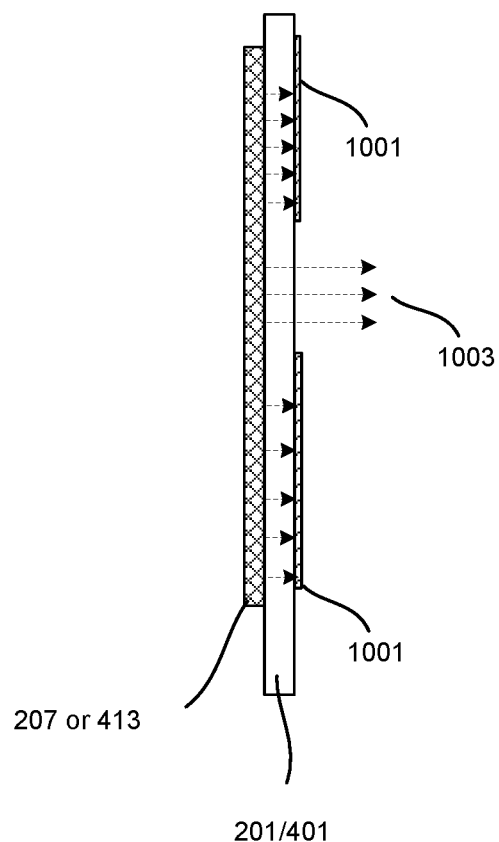
FIG. 10A—FIG. 10B illustrate a cross-sectional view and top view, respectively, of the stacking arrangement the light cover panel, the light source, and a marine grade vinyl cover sheet, according to an embodiment.
Figure 10B:
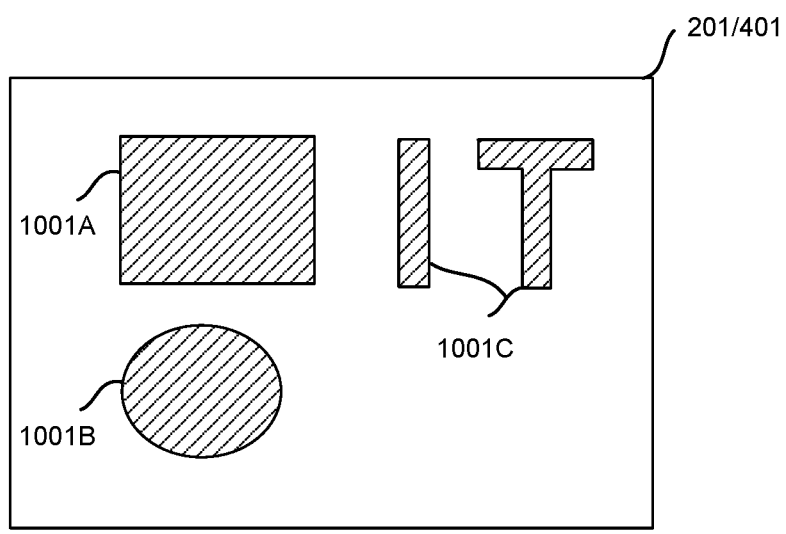

FIG. 10A—FIG. 10B illustrate a cross-sectional view and top view, respectively, of the stacking arrangement the light cover panel 201/401, the light source 207/413, and a marine grade vinyl cover sheet 1001, according to an embodiment. In FIG. 10A, the marine grade vinyl cover sheet 1001 may be disposed above the light cover panel 201/401, acting as a blocking layer for blocking light 1003 emitted by the light source 207/413 in selected areas of the light cover panel 201/401. As shown in FIG. 10B, various shapes, patterns and/or texts (1001A, 1001B, 1001C) of the marine grade vinyl cover sheet 1001 may be applied to the light cover panel 201/401, enhancing its visual appearance.

Figure 11:
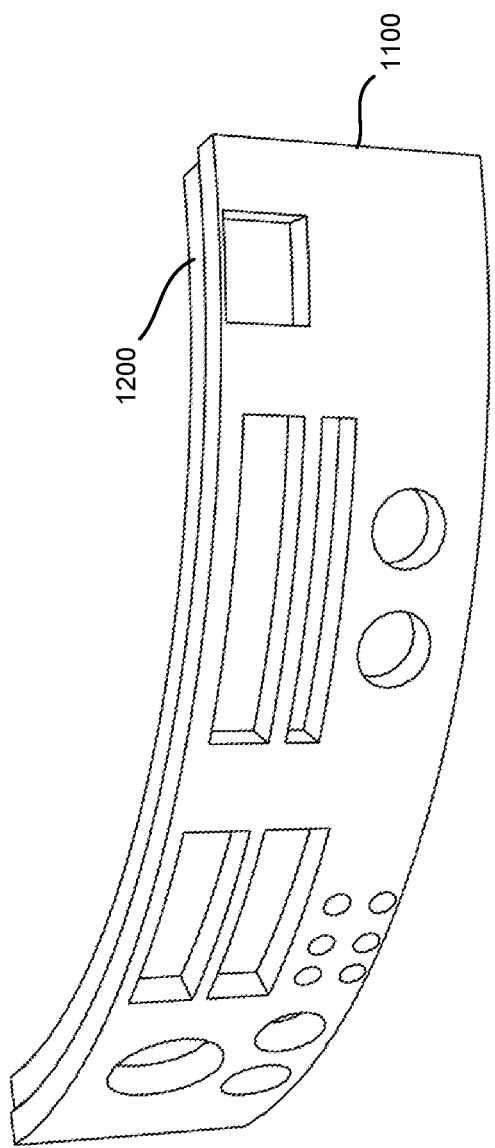
FIG. 11 illustrates a front perspective view of a marine retrofitted illuminated dash panel cover having a curved body, according to an embodiment.

FIG. 11 illustrates a front perspective view of a marine retrofitted illuminated dash panel cover 1100 having a curved body, according to an embodiment. In yet another implementation, other custom marine retrofitted illuminated dash panel covers may be fabricated into practically any shape and may be custom made to conform to planar surfaces, curved surfaces, or a combination of planar and curved surfaces. For example, the curved body dash panel cover 1100 may be custom made to retrofit with a matching curved body boat dash panel 1200 as shown in FIG. 11.

Some advantages of the marine retrofitted illuminated dash panel cover include:
a. Third party lighting can be applied to the marine retrofitted illuminated dash panel cover to illuminate the light cover panel 201/401, allowing color and intensity to be controlled from many chart plotters, Bluetooth sources, or an existing switch on the boat vessel.
b. The light cover panel 201/401 can be retrofitted easily to most existing boat dashes with standard marine hardware (such as stainless steel fasteners) often using the existing screw locations on the original dash by replacing the existing hardware with longer hardware of the same diameter.
c. Avoids creating new holes in many boat dashes. The light cover panel 201/401 can be cut to fit over existing switches, chart plotters, outlets, etc.
d. The light cover panel 201/401 can be made from Lexan or Plexiglas so that the original dash can be seen through it for daytime use, and the light cover panel 201/401 can be illuminated for night time use.
e. The light cover panel 201/401 may be made from marine grade materials to withstand saltwater or freshwater environments.
f. Marine grade vinyl can be added over the light cover panel 201/401 to block areas that you wish not to see through and to not illuminate.

As used in the specification and the appended claims, the singular forms "a", "an", and "the" included plural referents unless the context clearly dictates otherwise.

The foregoing disclosure has been provided merely for the purpose of explanation and is in no way to be construed as limiting of the present invention. Although the present invention has been shown and described with respect to several preferred embodiments thereof, various changes, omissions, and additions to the form and detail thereof, may be made therein, without departing from the spirit and scope of the invention. It is understood that the words which have been used herein are words of description and illustration, rather than words of limitation. Changes may be made, within the purview of the appended claims, as presently stated and as amended, without departing from the scope and spirit of the present invention in its aspects.

Other embodiments and modifications of the present invention may occur to those of ordinary skill in the art in view of these teachings. Accordingly, the invention is to be limited only by the following claims which include all other such embodiments and modifications when viewed in conjunction with the above specifications and accompanying drawings.

What is claimed is:
1. A marine retrofitted illuminated dash panel cover for illuminating an existing boat dash panel having one or more switches, buttons, and display monitors, comprising:
 a light cover panel having a plurality of holes and slots, and a body having a shape and size that is configured to match the existing boat dash panel, wherein the plurality of holes and slots of the light cover panel allows access to the one or more switches, buttons, and display monitors of the existing boat dash panel when the light cover panel is retrofitted and mounted onto the existing boat dash panel;
 a light source coupled to the light cover panel for illuminating the one or more switches, buttons, and display monitors of the existing boat dash panel; and
 a light controller coupled to the light cover panel and the light source, wherein the light controller controls a light power source and different color modes of operation of the light source, wherein the light cover panel and the light source are aftermarket retrofitted components to the existing boat dash panel.
2. The marine retrofitted illuminated dash panel cover of claim 1, wherein the light cover panel is transparent or translucent.
3. The marine retrofitted illuminated dash panel cover of claim 1, wherein the light controller includes a power switch and a color controller.
4. The marine retrofitted illuminated dash panel cover of claim 1, wherein the light controller includes a wireless transceiver and an antenna.
5. The marine retrofitted illuminated dash panel cover of claim 4, wherein the light controller includes a wireless remote control unit.
6. The marine retrofitted illuminated dash panel cover of claim 5, wherein the wireless remote control unit communicates with the wireless transceiver via a WiFi, Bluetooth, or ZigBee wireless protocol.
7. The marine retrofitted illuminated dash panel cover of claim 1, wherein the light cover panel is coupled to the existing boat dash panel via a plurality of hardware fasteners.
8. The marine retrofitted illuminated dash panel cover of claim 1, wherein the light cover panel is coupled to the existing boat dash panel via an adhesive layer.
9. The marine retrofitted illuminated dash panel cover of claim 1, wherein the different modes of operation of the light source includes a color selection mode, color intensity mode, and a light-pulsation mode.

10. The marine retrofitted illuminated dash panel cover of claim 1, wherein the marine retrofitted illuminated dash panel cover is planar when retrofitted to the existing boat dash panel having a planar surface and is curved when the marine retrofitted illuminated dash panel cover is retrofitted to the existing boat dash panel having a curved surface.

* * * * *